United States Patent Office 3,161,512
Patented Dec. 15, 1964

3,161,512
COLOUR COUPLERS AND THEIR PRODUCTION AND USE IN COLOUR PHOTOGRAPHY
Colin William Greenhalgh, Swinton, Manchester, England, assignor to Ilford Limited, Ilford, England, a British company
No Drawing. Filed Dec. 12, 1960, Ser. No. 75,081
Claims priority, application Great Britain, Dec. 23, 1959, 43,668/59
3 Claims. (Cl. 96—55)

This invention relates to colour couplers and to their production and use in colour photography.

Many modern processes of colour photography are based on the development of a developable silver salt photographic image by means of an aromatic primary amino compound, such as an N,N-diethyl p-phenylene diamine or a derivative thereof in the presence of a so-called colour coupler, this being a compound which will couple with the oxidation products of the developer to yield a dye image, usually an azamethine or quinone-imine dye image, in situ with the developed silver.

Where, as in many of the processes, the colour coupler is incorporated in the photographic emulsion layer in which the image is ultimately to be formed, it is important that it should be non-diffusing in such layer, i.e. that it should neither diffuse away during the processing steps nor migrate from its layer to any adjacent layer. Many attempts have been made to achieve this characteristic of non-diffusibility, i.e. to make the colour coupler substantive to the medium, usually gelatin, of the photographic emulsion. The methods which have been employed consist generally in the use of colour couplers containing groups of substantial molecular size, e.g. long chain alkyl groups, and also solubilising groups. Such colour couplers are often manufactured by a synthesis which involves several stages and the colour couplers are usually difficult to isolate and purify. It is one object of the present invention to provide a new class of colour couplers which are non-diffusing in photographic emulsion layers, and which may be manufactured by a simple synthetic process and may readily be isolated and purified.

According to a first feature of the present invention there is provided, as a new class of colour couplers, compounds of the general formula I:

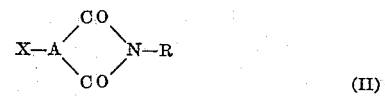

(I)

where A is a trivalent radical selected from

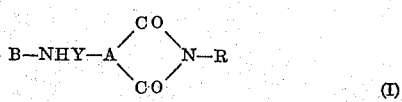

and

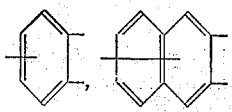

where $n$ is 1 or 2, B is a colour coupler residues as hereinafter defined, Y is a —CO—, —SO$_2$—, —CONH—, —COCH$_2$— or —CSNH— group, and R is hydrogen or a hydrocarbon or substituted hydrocarbon group.

By the term "colour coupler residue" used to define the symbol B is meant a grouping such that the compound B—NH$_2$ is a compound which will react with the oxidation products of N,N-diethyl p-phenylene diamine, formed during the development of a silver salt image with that compound, to yield a quinone-imine or azamethine dyestuff.

According to a further feature of this invention, colour couplers of the general formula I are prepared by condensing a compound of the general Formula II:

(II)

wherein A and R have the meanings assigned to them above and X is a —COHal, —CH$_2$COHal, —SO$_2$Hal, —NCO, —NHCOOC$_6$H$_5$ or —NCS group, with a compound of the general Formula III:

B—NH$_2$ (III)

where B has the meaning assigned to it above.

The colour couplers containing an amino group which may be used in the process of the invention are for example:

(1) Those which contain a —CO—CH$_2$—CO group, for example 4'-methoxybenzoylacet-4-amino-2-methoxyanilide, and which give yellow dyestuffs on colour development with substituted p-phenylene diamines.

(2) Those which contain a cyanoacetyl group or a pyrazolone ring, for example 4-ω-cyanoacetylaniline, 1-phenyl-3-amino-5-pyrazolone and 1-phenyl-3-(4'-aminophenyl)-5-pyrazolone, and which give magenta dyestuffs on colour development with substituted p-phenylene diamines.

(3) Phenols and 1-naphthols, which contain an amino group, for example 1-amino-5-naphthol and 4-chloro-5-methyl-2-aminophenol, and which give cyan dyestuffs on colour development with substituted p-phenylene diamines.

The new colour couplers of the invention may be used in the developing solution or they may be included in a light-sensitive layer or in a non-light-sensitive layer adjacent to a sensitive layer or separated therefrom by a water-permeable colloid layer.

It is a preferred feature of the invention to include the new colour couplers of the invention in a light-sensitive gelatino- or gelatino-substitute silver halide emulsion layer which forms part of a multilayer film or paper of the kind used for colour photography.

The multilayer colour photographic material may be a natural order material in which the images are to be formed in colours complementary to those of the original object or one in which an unnatural order is used, for example one in which in the top layer there is formed a yellow image of the blue parts of the object, in one of the two lower layers there is formed a cyan image of the green parts of the object and in the other a magenta image of the red parts of the object.

The new colour couplers may be incorporated in the photographic emulsion layers by taking them up in dilute alkali, e.g. dilute sodium hydroxide and adding the resulting solution to the emulsion. The alkali has the effect of opening the ring structure:

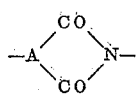

to afford a free carboxylic or sulphonic acid group imparting solubility to the compound. Alternatively, the compounds may be dispersed, for example in a non-solvent medium, and the dispersion added to the photographic emulsion.

The following examples will serve to illustrate the invention:

EXAMPLE 1

*4'-Methoxybenzoylacet-2-methoxy-5(N-n-octadecylphthalimid-4-yl-carbonylamino) anilide*

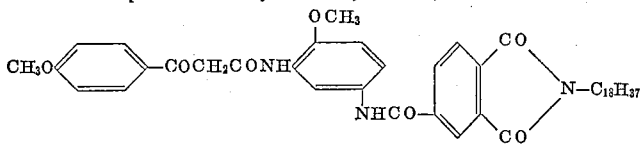

A solution of 4.61 parts of 4-chlorocarbonyl-N-n-octadecylphthalimide in 10 parts of acetic acid is added to a solution of 3.14 parts of 4'-methoxybenzoylacet-2-methoxy-5-aminoanilide and 0.82 part of anhydrous sodium acetate in 15 parts of acetic acid. After heating at the boil for a few minutes the mixture is heated at 95–100° C. for 75 minutes, then re-heated to the boil, filtered from sodium chloride and the filtrate diluted with 30 parts of methanol. The precipitated colour former is filtered off, washed with methanol, then diethyl ether, and dried to give 6 parts of 4'-methoxybenzoylacet-2-methoxy-5(N-n-octadecylphthalimid-4-yl-carbonylamino) anilide as a pale yellow solid having melting point 164–166° C. On analysis the colour coupler is found to contain 72.1% carbon, 7.6% of hydrogen and 5.5% of nitrogen. ($C_{44}H_{57}O_7N_3$ requires 71.45% of carbon, 7.7% of hydrogen and 5.7% of nitrogen.)

The 4-chlorocarbonyl-N-n-octadecylphthalimide used in the above example may be prepared as follows:

10 parts of 4-carboxy-N-octadecylphthalimide and 40 parts of thionyl chloride is heated under reflux for ½ hour and then evaporated to dryness under reduced pressure. The acid chloride is obtained as a colourless crystalline solid melting at 70–72° C. and on analysis is found to contain 2.8% of nitrogen and 8.2% chlorine. ($C_{27}H_{40}O_3NCl$ requires 3.05% of nitrogen and 7.7% of chlorine.)

4-carboxy-N-n-octadecylphthalimide itself may be obtained as follows:

9.6 parts of trimellitic anhydride is added to a hot solution of 13.4 parts of octadecylamine in 30 parts of acetic acid and the solution obtained heated at the boil for one hour. After cooling the mixture is diluted with diethyl ether, filtered and the product washed with diethyl ether and dried. The acid is obtained as colourless crystals melting at 136–138° C.

A photographic emulsion layer containing the colour coupler may be obtained in the following manner:

5 parts of 2 N potassium hydroxide solution are added to a suspension of 2.5 parts of the colour coupler in 25 parts of methanol and 5 parts of water. The mixture is warmed and when solution is obtained it is diluted to 50 parts with water. The colour coupler solution is added to 200 parts of a gelatin-silver halide emulsion and the emulsion coated on to a film base and the coated layer dried. When the photographic material so obtained is exposed to blue light, developed in a colour developer containing 4-amino-N-ethyl-N-ε-hydroxypentylaniline, bleached and fixed, a yellow dye image is obtained which has an absorption maximum at a wavelength of light of 428 millimicrons.

EXAMPLE 2

*1-Phenyl-3(N-n-Octadecylphthalimid-4-Yl-Carbonylamino)-5-Pyrazolone*

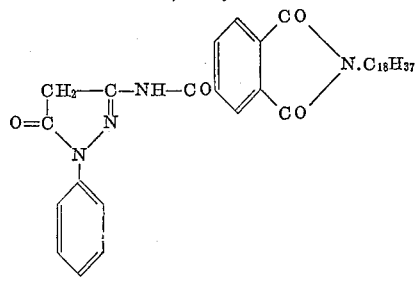

In place of the 3.14 parts of 4'-methoxybenzoylacet-2-methoxy-5-aminoanilide used in Example 1 there are used 1.75 parts of 1-phenyl-3-amino-5-pyrazolone. 4.6 parts of 1-phenyl-3(N-octadecylphthalimid-4-yl-carbonylamino)-5-pyrazolone are obtained as a pale yellow solid melting at 150–152° C. On analysis the colour coupler is found to contain 71.9% of carbon and 8.5% of hydrogen. ($C_{36}H_{48}O_4N_4$ requires 72.0% of carbon and 8.5% of hydrogen.)

A photographic emulsion layer containing the colour coupler may be obtained in the following manner:

3.8 parts of 2 N potassium hydroxide solution is added to a suspension of 2.5 parts of the colour coupler in 25 parts of methanol and 5 parts of water. The mixture is warmed and when solution is obtained it is diluted to 50 parts with water. The colour coupler solution is added to 200 parts of a green-sensitive gelatin-silver halide emulsion and the emulsion coated on to a film base and the coated layer dried. When the photographic material so obtained is exposed to green light, developed in a colour developer containing 4-amino-N-ethyl-N-ε-hydroxypentylaniline, bleached and fixed, a magenta dye image is obtained which has an absorption maximum at a wavelength of light of 529 millimicrons.

EXAMPLE 3

*1-Hydroxy-N-[Beta(N-n-Octadecylphthalimid-4-Yl-Carbonylamino)Ethyl]2-Naphthamide*

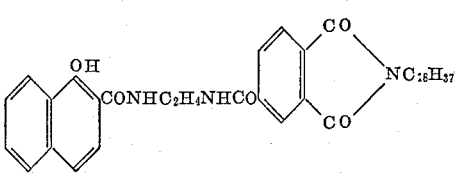

In place of the 3.14 parts of 4'-methoxybenzoylacet-2-methoxy-5-aminoanilide used in Example 1 there are used 2.3 parts of 1-hydroxy-N-(beta-aminoethyl)2-naphthamide. 4.5 parts of 1-hydroxy-N-[beta(N-n-octadecylphthalimid-4-yl-carbonylamino)ethyl]2 - naphthamide is obtained as colourless micro crystals having melting point 135–137° C. On analysis the colour coupler is found to contain 73.2% of carbon and 8.8% of hydrogen. ($C_{40}H_{53}O_5N_3$ requires 73.3% of carbon and 8.1% of hydrogen.)

EXAMPLE 4

*4'-Methoxybenzoylacet-2-Methoxy-5(N-n-Octadecyl-phthalimid-4-Yl-Ureido) Anilide.*

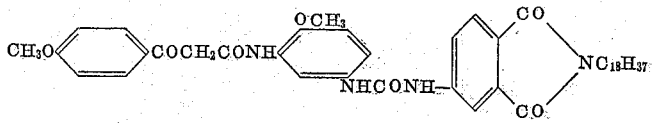

4.4 parts of 4-isocyanato-N-n-octadecylphthalimide is added to a solution of 3.14 parts of 4'-methoxybenzoylacet-2-methoxy-5-aminoanilide in 40 parts of dry dioxan and the solution obtained heated under reflux for one hour. After cooling the precipitated microcrystalline colour coupler is filtered off, washed with diethyl ether and dried. The 6.4 parts of 4'-methoxybenzoylacet-2-methoxy-5(N-n-octadecylphthalimid-4-yl-ureido) anilide obtained melts at 186–188° C. and on analysis is found to contain 69.9% of carbon, 7.5% of hydrogen and 7.5% of nitrogen. ($C_{44}H_{58}O_7N_4$ requires 70.1% of carbon, 7.7% of hydrogen and 7.45% of nitrogen.)

The 4-isocyanato-N-n-octadecylphthalimide used in the above example may be prepared in the following manner:

A solution of 8.3 parts of 4-amino-N-octadecylphthalimide in 50 parts of dry toluene is added to 50 parts of dry toluene previously saturated with phosgene at 25° C. The suspension obtained is stirred at 25° C. for 2 hours and then heated to the boil and maintained at the boil for 15 minutes. During this time a slow stream of phosgene is passed through the solution which is obtained. After cooling the colourless crystalline product is filtered off, washed with petroleum ether and dried to give 6.5 parts of 4-isocyanato-N-n-octadecylphthalimide melting at 94–96° C.

The 4-amino-N-n-octadecylphthalimide itself may be obtained as follows:

26.9 parts of n-octadecylamine are added to a hot solution of 19.3 parts of 4-nitrophthalic anhydride in 40 parts of acetic acid and the solution obtained heated under reflux for one hour. After cooling and dilution with diethyl ether the product is filtered off, washed with diethyl ether and dried to give 36 parts of 4-nitro-N-n-octadecylphthalimide as colourless plate crystals melting at 92–94° C. The 36 parts of nitro compound in 500 parts of ethyl acetate is then hydrogenated under pressure at 60—65° C. for 6 hours using Raney nickel as catalyst and the amine obtained recrystallised from ethyl acetate. The 4-amino-N-n-octadecylphthalimide is obtained as lemon yellow crystals having melting point 90–92° C. and on analysis is found to contain 75.5% of carbon, 10.4% of hydrogen and 6.7% of nitrogen. ($C_{26}H_{42}O_2N_2$ requires 75.35% of carbon, 10.15% of hydrogen and 6.75% of nitrogen.)

EXAMPLE 5

*1-Phenyl-3(N-n-Octadecylphthalimid-4-Yl-Ureido)-5-Pyrazolone*

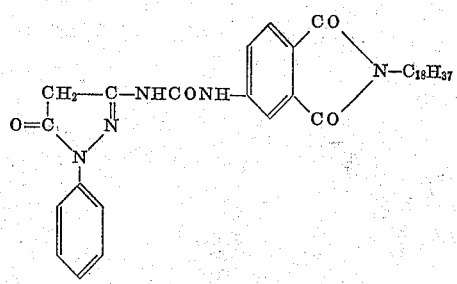

In place of the 3.14 parts of 4'-methoxybenzoylacet-2-methoxy-5-aminoanilide used in Example 4 there are used 1.75 parts of 1-phenyl-3-amino-5-pyrazolone. The 1-phenyl - 3(N-n-octadecylphthalimid-4-yl-ureido)-5-pyrazolone obtained melts at 218–220° C. and on analysis is found to contain 11% of nitrogen. ($C_{36}H_{49}O_4N_5$ requires 11.4% of nitrogen.)

EXAMPLE 6

*1-Phenyl-3(N-n-Butylphthalimid-4-Yl-Carbonyl-amino)-5-Pyrazolone*

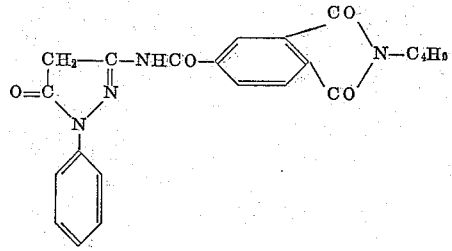

A solution of 26.5 parts of 4-chlorocarbonyl-N-n-butylphthalimide in 50 parts of dioxan is added to a warm solution of 17.5 parts of 1-phenyl-3-amino-5-pyrazolone in 50 parts of dioxan and the solution heated under reflux for ¾ hour. The reaction mixture is poured into 75 parts of water and the precipitated product filtered off, triturated with ethanol and then with diethyl ether and recrystallised from a mixture of n-propanol and chloroform (4:1). The colour coupler is obtained as fawn crystals melting at 200–201° C. and on analysis is found to contain 65.6% of carbon, 4.9% of hydrogen and 13.7% of nitrogen. ($C_{22}H_{20}O_4N_4$ requires 65.5% of carbon, 4.95% of hydrogen and 13.9% of nitrogen.)

The 4-chlorocarbonyl-N-n-butylphthalimide used in the above example has melting point 76–78° C. (found: 59.0% of carbon, 4.5% of hydrogen and 13.7% of nitrogen. $C_{13}H_{12}O_3NCl$ requires 58.7% of carbon, 4.5% of hydrogen and 13.8% of nitrogen) and is obtained from 4-carboxy-N-n-butylphthalimide by reaction with thionyl chloride. The acid is itself obtained by the reaction of trimellitic anhydride with n-butylamine in acetic acid and has melting point 167–168° C. after recrystallisation from aqueous methanol. (Found: 63.3% of carbon, 5.0% of hydrogen and 5.7% of nitrogen. $C_{13}H_{13}O_4N$ requires 63.2% of carbon, 5.25% of hydrogen and 5.65% of nitrogen.)

EXAMPLE 7

*1-Phenyl-3-(N-n-Hexylphthalimid-4-Yl-Carbonyl-amino)-5-Pyrazolone*

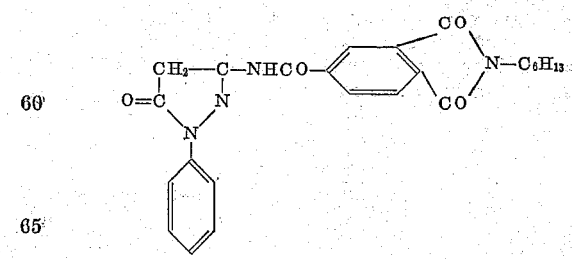

In place of the 26.5 parts of 4-chlorocarbonyl-N-n-butylphthalimide used in Example 6 there are used 29.3 parts of 4-chlorocarbonyl-N-n-hexylphthalimide. The colour coupler which is recrystallised from butyl acetate is obtained as fawn crystals melting at 199° C. and on analysis is found to contain 66.6% of carbon, 5.4% of hydrogen and 12.8% of nitrogen. ($C_{24}H_{24}O_4N_4$ requires 66.6% of carbon, 5.6% of hydrogen and 12.9% of nitrogen.)

The 4-chlorocarbonyl-N-n-hexylphthalimide used in the above example melts at 60–61° C. after recrystallisation from petroleum ether (B. Pt. 40–60° C.) and the 4-carboxy-N-n-hexylphthalimide from which it is obtained by treatment with thionyl chloride melts at 141–142° C. (Found: 65.4% of carbon, 6.2% of hydrogen and 4.5% of nitrogen. $C_{15}H_{17}O_4N$ requires 65.5% of carbon, 6.2% of hydrogen and 5.1% of nitrogen.)

A photographic emulsion layer containing the colour coupler may be obtained in the following manner:

2.9 parts of 2 N potassium hydroxide solution is added to a suspension of 1.17 parts of the colour coupler in 16 parts of n-propanol. The mixture is warmed and when a solution is obtained water is added to give a total of 50 parts. The colour coupler solution so obtained is added to 200 parts of a green-sensitive gelatin silver halide emulsion and the emulsion coated on to a film base and the coated layer dried. When the photographic material so obtained is exposed to green light, developed in a colour developer containing 4-amino-N-ethyl-N-ε-hydroxypentylaniline, bleached and fixed, a magenta dye image is obtained which has an absorption maximum at a wavelength of light of 530 millimicrons.

EXAMPLE 8

1-Phenyl-3-(N-n-Octylphthalimid-4-Yl-Carbonylamino)-5-Pyrazolone

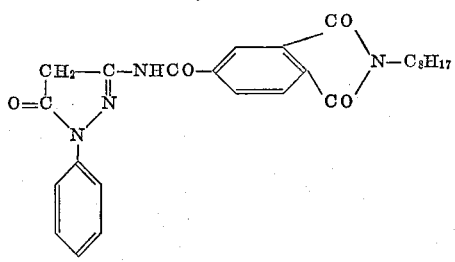

In place of the 26.5 parts of 4-chlorocarbonyl-N-n-butylphthalimide used in Example 6 there are used 32.2 parts of 4-chlorocarbonyl-N-n-octylphthalimide. The colour coupler is recrystallised from a mixture of n-propanol and chloroform (4:1) and is obtained as fawn crystals melting at 194–195° C. On analysis the coupler is found to contain 67.6% of carbon, 6.0% of hydrogen and 12.4% of nitrogen. ($C_{26}H_{28}O_4N_4$ requires 68.0% of carbon, 6.1% of hydrogen and 12.15% of nitrogen.)

The 4-chlorocarbonyl-N-n-octylphthalimide used in the above example melts at 57–59° C. and the 4-carboxy-N-n-octylphthalimide from which it is derived melts at 143–144° C. after crystallisation from a petroleum fraction boiling between 100 and 120° C. containing 5% of acetic acid. (Found: 67.2% of carbon, 6.6% of hydrogen, and 4.5% of nitrogen. $C_{17}H_{21}O_4N$ requires 67.5% of carbon, 6.95% of hydrogen and 4.6% of nitrogen.)

A photographic emulsion layer containing 1.25 parts of the colour coupler formulated by the method described in Example 7 gives a magenta dye image with light absorption maximum at 528 millimicrons.

EXAMPLE 9

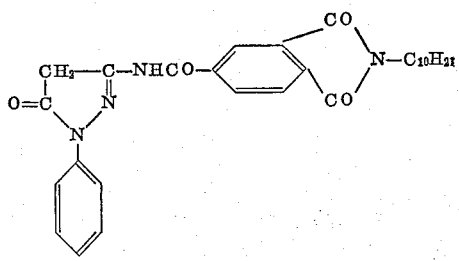

A mixture of 34.95 parts of 4-chlorocarbonyl-N-n-decylphthalimide, 17.5 parts of 1-phenyl-3-amino-5-pyrazolone and 50 parts of diethyl oxalate is stirred and heated at 100° C. for 2 hours. After a few minutes the reactants dissolve to give an orange-brown solution and after 15 minutes the colour coupler crystallises out. 200 parts of methanol are added and the mixture stirred and heated until solution is obtained when 50 parts of water are added and the solution cooled. The precipitated colour coupler is filtered off, washed with methanol and then diethyl ether and recrystallised from n-propanol. The colour coupler is obtained as yellow-fawn plate crystals melting at 186–188° C. and on analysis is found to contain 68.6% of carbon, 6.0% of hydrogen and 11.5% of nitrogen. ($C_{28}H_{32}O_4N_4$ requires 68.8% of carbon, 6.55% of hydrogen and 11.5% of nitrogen.)

The 4-chlorocarbonyl-N-n-decylphthalimide used in the above example melts at 57–59° C. after recrystallisation from a petroleum ether fraction boiling between 60 and 80° C. and the 4-carboxy-N-n-decylphthalimide from which it is derived melts at 139–141° C. after recrystallisation from ethyl acetate.

A photographic emulsion layer containing 1.32 parts of the colour coupler formulated by the method described in Example 7 gives a magenta dye image with light absorption maximum at 530 millimicrons.

EXAMPLE 10

1-Phenyl-3-(N-n-Dodecylphthalimid-4Yl-Carbonylamino)-5-Pyrazolone

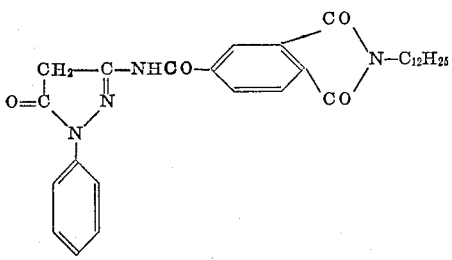

In place of the 34.95 parts of 4-chlorocarbonyl-N-n-decylphthalimide used in Example 9 there are used 38 parts of 4-chlorocarbonyl-N-n-dodecylphthalimide. The reaction mixture is cooled, diethyl ether added and the colour coupler filtered off, washed with diethyl ether and recrystallised from acetic acid. The colour coupler is obtained as yellow-fawn plate crystals melting at 176–177° C. and on analysis is found to contain 69.8% of carbon, 6.9% of hydrogen and 10.3% of nitrogen. ($C_{30}H_{36}O_4N_4$ requires 69.8% of carbon, 7.0% of hydrogen and 10.85% of nitrogen.)

The 4-chlorocarbonyl-N-n-dodecylphthalimide used in the above example melts at 58–60° C. and the 4-carboxy-N-n-dodecylphthalimide from which it is derived melts at 136–138° C.

A photographic emulsion layer containing 1.39 parts of the colour coupler formulated by the method described in Example 7 gives a magenta dye image with a light absorption maximum at 530 millimicrons.

EXAMPLE 11

1-Phenyl-3-(N-n-Tetradecylphthalimid-4-Yl-Carbonylamino)-5-Pyrazolone

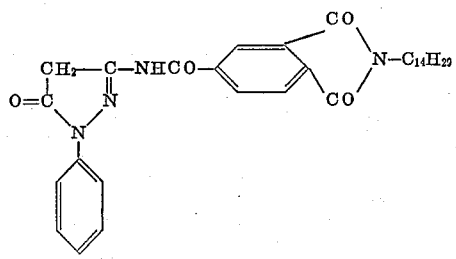

In place of the 34.95 parts of 4-chlorocarbonyl-N-n-decylphthalimide used in Example 9 there are used 40.5 parts of 4-chlorocarbonyl-N-n-tetradecylphthalimide. The colour coupler is recrystallised first from ethyl acetate and then from butyl acetate when it is obtained as yellow-fawn crystals melting at 182–184° C., and on analysis is found to contain 70.9% of carbon, 7.1% of hydrogen and 10.3% of nitrogen. ($C_{32}H_{40}O_4N_4$ requires 70.6% of carbon, 7.35% of hydrogen and 10.3% of nitrogen.)

The 4-chlorocarbonyl-N-n-tetradecylphthalimide used in the above example melts at 59–61° C. after recrystallisation from a petroleum fraction boiling between 60 and 70° C. The 4-carboxy-N-n-tetradecylphthalimide from which the acid chloride is derived itself melts at 136–137° C. after recrystallisation from ethyl acetate. (Found: 70.9% of carbon, 8.3% of hydrogen and 3.5% of nitrogen. $C_{23}H_{33}O_4N$ requires 71.3% of carbon, 8.5% of hydrogen and 3.6% of nitrogen.)

A photographic emulsion layer containing 1.47 parts of the colour coupler formulated by the method of Example 7 gives a magenta dye image with light absorption maximum at 528 millimicrons.

EXAMPLE 12

*1-Phenyl-3(N-n-Hexadecylphthalimid-4-Yl-Carbonylamino)-5-Pyrazolone*

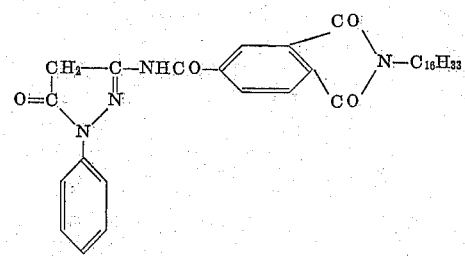

In place of the 34.95 parts of 4-chlorocarbonyl-N-n-decylphthalimide used in Example 9 there are used 43.3 parts of 4-chlorocarbonyl-N-n-hexadecylphthalimide. The colour coupler is recrystallised from butyl acetate when it is obtained as yellow-fawn crystals melting at 178–179° C. On analysis the colour coupler is found to contain 71.3% of carbon, 7.4% of hydrogen and 9.9% of nitrogen. ($C_{34}H_{44}O_4N_4$ requires 71.3% of carbon, 7.7% of hydrogen and 9.8% of nitrogen.)

The 4-chlorocarbonyl-N-n-hexadecylphthalimide used in the above example melts at 62–64° C. after recrystallisation from a petroleum fraction boiling between 60 and 80° C. and the 4-carboxy-N-n-hexadecylphthalimide from which it is derived melts at 138–140° C. after recrystallisation from methanol. (Found: 72.2% of carbon, 8.7% of hydrogen and 3.2% of nitrogen. $C_{25}H_{37}O_4N$ requires 72.5% of carbon, 8.9% of hydrogen and 3.4% of nitrogen.)

A photographic emulsion layer containing 1.54 parts of the colour coupler formulated by the method of Example 7 gives a magenta dye image with a light absorption maximum at 529 millimicrons.

Alternatively the colour coupler may be dispersed and then added to the photographic emulsion. The dispersion may be obtained in the following manner:

4 parts of the colour coupler, 0.8 part of saponin as a 5% aqueous solution and 20 parts of water is ball milled until a fine dispersion is obtained.

EXAMPLE 13

*1-Phenyl-3[N-(4-n-Dodecylphenyl)Phthalimid-4-Yl-Carbonylamino]-5-Pyrazolone*

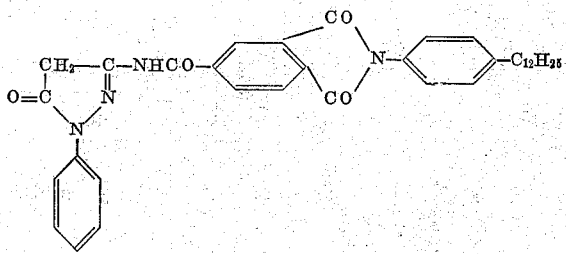

In place of the 34.95 parts of 4-chlorocarbonyl-N-n-decylphthalimide used in Example 9 there are used 45.3 parts of 4-chlorocarbonyl-N-(4-n-dodecylphenyl)phthalimide. The colour coupler is recrystallised from acetic acid when it is obtained as yellow-fawn plate crystals melting at 228–230° C. On analysis the colour coupler is found to contain 73.2% of carbon, 6.7% of hydrogen and 9.3% of nitrogen. ($C_{36}H_{40}O_4N_4$ requires 73.0% of carbon, 6.75% of hydrogen and 9.45% of nitrogen.)

The 4-chlorocarbonyl - N - (4-n-dodecylphenyl)phthalimide used in the above example melts at 128–130° C. after recrystallisation from a mixture of benzene and a petroleum fraction B. Pt. 80–100° C. (1:1) and the 4-carboxy N(4-n-dodecylphenyl)phthalimide from which it is derived melts at 218–220° C. after recrystallisation from acetic acid. (Found: 74.3% of carbon, 7.6% of hydrogen and 3.4% of nitrogen. $C_{27}H_{33}O_4N$ requires 74.45% of carbon, 7.6% of hydrogen and 3.2% of nitrogen.)

A photographic emulsion layer containing 1.59 parts of the colour coupler formulated by the method of Example 7 gives a magenta dye image with a light absorption maximum at 530 millimicrons.

EXAMPLE 14

*4(N-n-Dodecylphthalimid-4-Yl-Carbonylamino)-ω-Cyanoacetylbenzene*

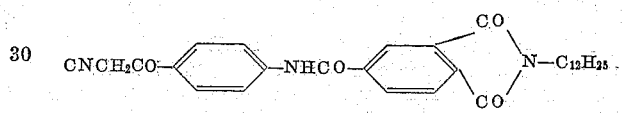

A mixture of 6.4 parts of ω-cyanoacetylaniline, 3.3 parts of anhydrous sodium acetate, 15.1 parts of 4-chlorocarbonyl-N-n-dodecylphthalimide and 60 parts of acetic acid is heated under reflux for one hour. The reaction mixture is cooled and the crystalline product filtered off, washed with methanol, water, and methanol, and then recrystallised from acetic acid to give the colour coupler as pinky-fawn crystals melting at 184–186° C.

On analysis the colour coupler is found to contain 8.0% of nitrogen. ($C_{30}H_{35}O_4N_3$ requires 8.4% of nitrogen.)

EXAMPLE 15

*1-Phenyl-3{α[N-(4'-n-Dodecylphenyl)Succinimido]Acetylamido}-5-Pyrazolone*

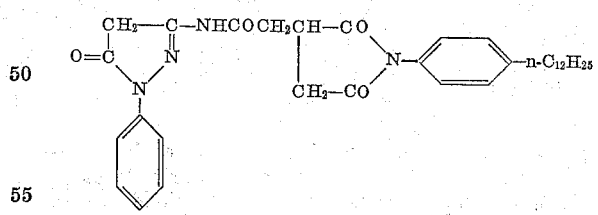

4.2 parts of α[N(4-n-dodecylphenyl)succinimido]acetyl chloride is added to a suspension of 1.75 parts of 1-phenyl-3-amino-5-pyrazolone in 5 parts of diethyl oxalate at 115° C. When a solution is obtained the reaction mixture is heated at 95–100° C. for 1¼ hours during which time the reaction mixture solidifies. After cooling to 50° C. 20 parts of methanol is added and the mixture boiled to effect solution. 3 parts of water are added to precipitate the colour coupler and the mixture cooled and the product filtered off, washed with methanol and dried. The colour coupler obtained (M. Pt. 182–184° C.) is recrystallised from 75 parts of butyl acetate to give 1-phenyl-3{α[N(4-n-dodecylphenyl)succinimido]acetylamido}-5-pyrazolone as colourless plate crystals melting at 184–186° C. On analysis the colour coupler is found to contain 70.6% of carbon, 7.4% of hydrogen and 10.0% of nitrogen. ($C_{33}H_{42}O_4N_4$ requires 71.0% of carbon, 7.55% of hydrogen, and 10.05% of nitrogen.)

The α[N(4-n-dodecylphenyl)succinimido]acetyl chloride used in the above example may be prepared in the following manner:

A mixture of 47 parts of α[N(4-n-dodecylphenyl)succinimido]acetic acid and 80 parts of thionyl chloride is heated under reflux for one hour and the solution evaporated to dryness. The residual solid is crystallised from a mixture of 50 parts of chloroform and 200 parts of a petroleum ether fraction boiling between 60 and 80° C. to give the acid chloride as colourless crystals melting at 92–94° C. On analysis the acid chloride is found to contain 69.1% of carbon, 7.8% of hydrogen, 3.4% of nitrogen and 8.5% of chlorine. ($C_{24}H_{34}O_3NCl$ requires 68.65% of carbon, 8.1% of hydrogen, 3.35% of nitrogen, and 8.45% of chlorine.)

The α[N(4-n-dodecylphenyl)succinimido]acetic acid itself may be prepared in the following manner:

A mixture of 31.6 parts of tricarballylic anhydride, 52 parts of 4-n-dodecylaniline and 120 parts of acetic acid is heated under reflux for 2 hours, then cooled to 50° C. and diluted with an equal volume of methanol. After further cooling the precipitated product is filtered off, washed with methanol and twice recrystallised from ethyl acetate to give α[N(4 - n - dodecylphenyl)succinimido]acetic acid as colourless crystals melting at 122–124° C. which on analysis are found to contain 3.5% of nitrogen. ($C_{24}H_{35}O_4N$ requires 3.4% of nitrogen.)

The tricarballylic anhydride itself may be prepared in the following manner:

A mixture of 108 parts of tricarballylic acid and 108 parts of acetyl chloride is stirred and heated under reflux for 6 hours and the solution obtained diluted with 750 parts chloroform. After keeping for 24 hours at 20° C. the tricarballylic anhydride is filtered off, washed with chloroform and dried. The anhydride melts at 128–130° C.

A photographic emulsion layer containing 1.46 parts of the colour coupler formulated by the method of Example 7 gives a magenta dye image with light absorption maximum at 530 millimicrons.

EXAMPLE 16

*1-Phenyl-3[α(N-n-Octadecylsuccinimido)Acetylamido]-5-Pyrazolone*

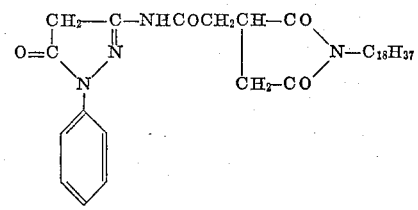

In place of the 4.2 parts of α[N(4-n-dodecylphenyl)succinimido]acetyl chloride used in Example 15 there is used 4.28 parts of α(N-n-octadecylsuccinimido)acetyl chloride. The colour coupler is obtained as colourless plate crystals melting at 169–170° C. and on analysis is found to contain 69.8% of carbon, 8.4% of hydrogen and 9.5% of nitrogen. ($C_{33}H_{50}O_4N_4$ requires 70.0% of carbon, 8.85% of hydrogen and 9.9% of nitrogen.)

The α(N-n-octadecylsuccinimido)acetyl chloride used in the above example is a waxy solid which may be prepared in a similar manner to α[N(4-n-dodecylphenyl)succinimido]acetyl chloride described in Example 15. The α(N-n-octadecylsuccinimido)acetic acid from which the acid chloride is derived is a colourless solid melting at 87–90° C. (Found: 3.4% of nitrogen. $C_{24}H_{43}O_4N$ requires 3.4% of nitrogen.)

A photographic emulsion layer containing 1.53 parts of the colour coupler formulated by the method of Example 7 gives a magenta dye image with a light absorption maximum at 530 millimicrons.

EXAMPLE 17

*1-Phenyl-3{α[N(4-n-Dodecylphenyl)Succinimidothio]Acetylamido}-5-Pyrazolone*

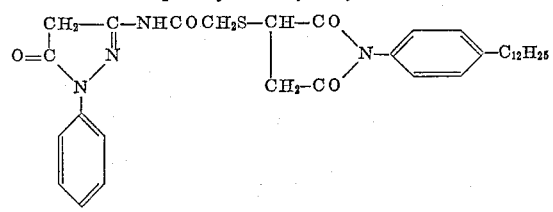

In place of the 4.2 parts of α[N(4-n-dodecylphenyl)succinimido]acetyl chloride used in Example 15 there are used 4.52 parts of α[N(4-n-dodecylphenyl)succinimidothio]acetyl chloride. The colour coupler is recrystallised from ethyl acetate when it is obtained as colourless crystals melting at 110–112° C. On analysis the colour coupler is found to contain 67.5% of carbon, 7.2% of hydrogen, 8.9% of nitrogen and 5.7% of sulphur. ($C_{33}H_{42}O_4N_4S$ requires 67.1% of carbon, 7.1% of hydrogen, 9.5% of nitrogen and 5.45% of sulphur.)

The α[N(4 - n - dodecylphenyl)succinimidothio]acetyl chloride used in the above example may be prepared in the following manner:

A solution of 9 parts of α[N(4-n-dodecylphenyl)succinimidothio]acetic acid in 20 parts of thionyl chloride is heated under reflux for ½ hour, and then evaporated to dryness under reduced pressure. The residue so obtained is crystallised from a petroleum fraction boiling between 60 and 80° C. to give the acid chloride as pale yellow micro crystals melting at 80–82° C.

The α[N(4 - n - dodecylphenyl)succinimidothio]acetic acid itself is prepared as follows:

A mixture of 10.4 parts of carboxymethylmercaptosuccinic acid and 13 parts of 4-n-dodecylaniline is stirred and heated at 180° C. for 1½ hours when no more water is being evolved. The reaction mixture is cooled and crystallised first from a petroleum fraction boiling between 60 and 80° C. and then twice from a benzene/methylcyclohexane mixture to give the acid as colourless micro crystals melting at 136–138° C. (Found: 66.3% of carbon, 8.0% of hydrogen and 3.5% of nitrogen. $C_{24}H_{35}O_4NS$ requires 66.5% of carbon, 8.1% of hydrogen and 3.25% of nitrogen.)

EXAMPLE 18

*4'-Methoxybenzoylacet-2-Methoxy-5-(N-n-Butylphthalimid-4-yl-Carbonylamino)-Anilide*

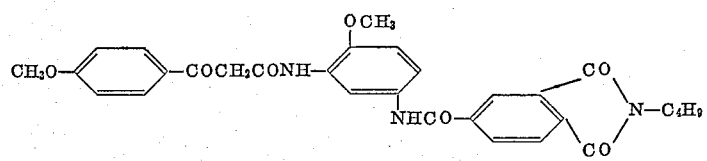

In place of the 4.61 parts of 4-chlorocarbonyl-N-n-octadecylphthalimide used in Example 2 there are used 2.65 parts of 4-chlorocarbonyl-N-n-butylphthalimide. The colour coupler is obtained as a pale yellow crystalline solid melting at 194–196° C. and on analysis is found to contain 7.8% of nitrogen. ($C_{30}H_{29}O_7H_3$ requires 7.75% of nitrogen.)

EXAMPLE 19

*4'-Methoxybenzoylacet-2-Methoxy-5-(N-n-Hexyl-phthalimid-4-yl-Carbonylamino)-Anilide*

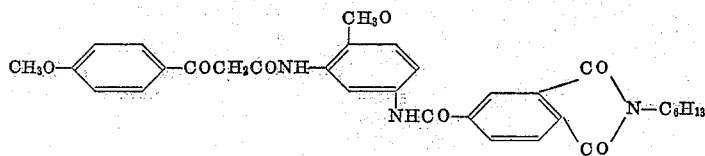

In place of the 4.61 parts of 4-chlorocarbonyl-N-n-octadecylphthalimide used in Example 2 there are used 2.94 parts of 4-chlorocarbonyl-N-n-hexylphthalimide. The colour coupler is obtained as a pale yellow crystalline solid melting at 198–200° C. and on analysis is found to contain 7.0% of nitrogen. ($C_{32}H_{33}O_7N_3$ requires 7.4% of nitrogen.)

A photographic emulsion layer containing the colour coupler may be obtained in the following manner:

4.6 parts of 2 N potassium hydroxide solution is added to a suspension of 3.18 parts of the colour coupler in 32 parts of n-propanol. The mixture is warmed and when a solution is obtained water is added to give a total of 64 parts. The colour coupler solution so obtained is added to 200 parts of a gelatin silver halide emulsion and the emulsion coated on to a film base and the coated layer dried. When the photographic material so obtained is exposed to blue light, developed in a colour developer containing 4-amino-N-ethyl-N-ε-hydroxypentylaniline, bleached and fixed a yellow dye image is obtained which has an absorption maximum at a wavelength of light of 434 millimicrons.

EXAMPLE 20

*4'-Methoxybenzoylacet-2-Methoxy-5-(N-n-Octyl-phthalimid-4-yl-Carbonylamino)-Anilide*

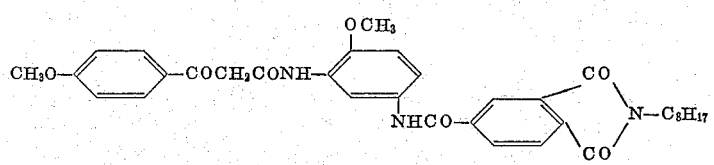

In place of the 4.61 parts of 4-chlorocarbonyl-N-n-octadecylphthalimide used in Example 2 there are used 3.22 parts of 4-chlorocarbonyl-N-n-octylphthalimide. The colour coupler is obtained as a pale yellow crystalline solid melting at 177–180° C. and on analysis is found to contain 67.6% of carbon, 5.8% of hydrogen and 7.3% of nitrogen. ($C_{34}H_{36}O_7N_3$ requires 68.2% of carbon, 6.1% of hydrogen and 7.1% of nitrogen.)

A photographic emulsion layer containing 3.32 parts of the colour coupler formulated by the method of Example 19 gives a yellow dye image with a light absorption maximum at 433 millimicrons.

EXAMPLE 21

*4'-Methoxybenzoylacet-2-Methoxy-5-(N-n-Decyl-phthalimid-4-yl-Carbonylamino)-Anilide*

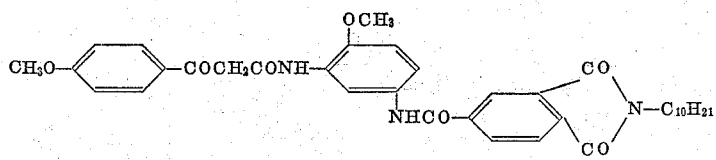

In place of the 4.61 parts of 4-chlorocarbonyl-N-n-octadecylphthalimide used in Example 2 there are used 3.5 parts of 4-chlorocarbonyl-N-n-decylphthalimide. The colour coupler is obtained as a pale yellow crystalline solid melting at 174–176° C. and on analysis is found to contain 68.4% of carbon, 6.1% of hydrogen and 6.8% of nitrogen. ($C_{36}H_{41}O_7N_3$ requires 68.9% of carbon, 6.55% of hydrogen and 6.8% of nitrogen.)

A photographic emulsion layer containing 3.48 parts of the colour coupler formulated by the method of Example 19 gives a yellow dye image with a light absorption maximum at 436 millimicrons.

EXAMPLE 22

*4'-Methoxybenzoylacet-2-Methoxy-5-(N-n-Dodecyl-phthalimid-4-yl-Carbonylamino)-Anilide*

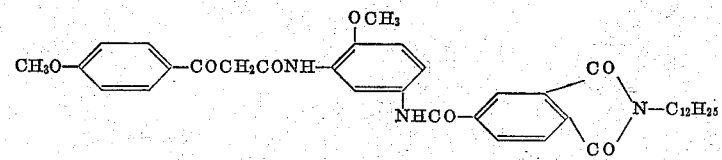

In place of the 4.61 parts of 4-chlorocarbonyl-N-n-octadecylphthalimide used in Example 2 there are used 3.78 parts of 4-chlorocarbonyl-N-n-dodecylphthalimide. The colour coupler is obtained as a pale yellow crystalline solid melting at 182–184° C. and on analysis is found to contain 70.2% of carbon, 6.8% of hydrogen and 6.4% of nitrogen. ($C_{38}H_{45}O_7N_3$ requires 69.6% of carbon, 6.85% of hydrogen and 6.4% of nitrogen.)

A photographic emulsion layer containing 3.63 parts of the colour coupler formulated by the method of Example 19 gives a yellow dye image with a light absorption maximum at 435 millimicrons.

EXAMPLE 23

4'-Methoxybenzoylacet-2-Methoxy-5-(N-n-Tetradecyl-phthalimid-4-Yl-Carbonylamino)-Anilide

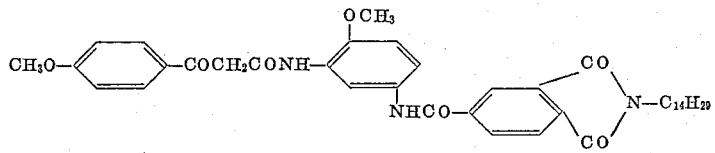

In place of the 4.61 parts of 4-chlorocarbonyl-N-n-octadecylphthalimide used in Example 2 there are used 4.06 parts of 4-chlorocarbonyl-N-n-tetradecylphthalimide. The colour coupler is obtained as a pale yellow crystalline solid melting at 178–180° C. and on analysis is found to contain 69.8% of carbon, 7.3% of hydrogen and 5.9% of nitrogen. ($C_{40}H_{49}O_7N_3$ requires 70.2% of carbon, 7.2% of hydrogen and 6.15% of nitrogen.)

A photographic emulsion layer containing 3.78 parts of the colour coupler formulated by the method of Example 19 gives a yellow dye image with a light absorption maximum at 435 millimicrons.

EXAMPLE 24

4'-Methoxybenzoylacet-2-Methoxy-5-(N-n-Hexadecyl-phthalimid-4-Yl-Carbonylamino)-Anilide

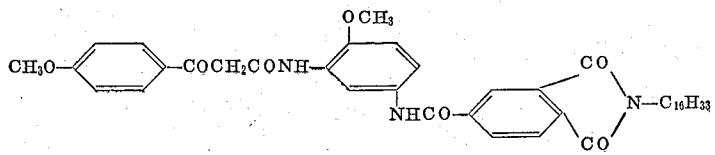

In place of the 4.61 parts of 4-chlorocarbonyl-N-n-octadecylphthalimide used in Example 2 there are used 4.44 parts of 4-chlorocarbonyl-N-n-hexadecylphthalimide. The colour coupler is obtained as a pale yellow crystalline solid melting at 164–166° C. and on analysis is found to contain 6.1% of nitrogen. ($C_{42}H_{53}O_7N_3$ requires 5.9% of nitrogen.)

A photographic emulsion layer containing 3.93 parts of the colour coupler formulated by the method of Example 19 gives a yellow dye image with a light absorption maximum at 431 millimicrons.

EXAMPLE 25

4'-Methoxybenzoylacet-2-Methoxy-5[N(4-n-Dodecyl-phenyl)Phthalimid-4-Yl-Carbonylamino]Anilide

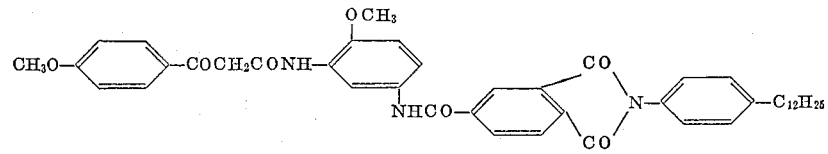

In place of the 4.61 parts of 4-chlorocarbonyl-N-n-octadecylphthalimide used in Example 2 there are used 4.54 parts of 4-chlorocarbonyl-N(4-n-dodecylphenyl)phthalimide. The colour coupler is recrystallised from β-ethoxyethanol and is obtained as a pale yellow crystalline solid melting at 207–208° C. and on analysis is found to contain 72.2% of carbon, 6.9% of hydrogen and 5.8% of nitrogen. ($C_{44}H_{49}O_7N_3$ requires 72.25% of carbon, 6.7% of hydrogen and 5.75% of nitrogen.)

A photographic emulsion layer containing 4.04 parts of the colour coupler formulated by the method of Example 19 gives a yellow dye image with a light absorption maximum at 430 millimicrons.

EXAMPLE 26

4'-Methoxybenzoylacet-2-Methoxy-5-(N-Cyclohexyl-phthalimid-4-Yl-Carbonylamino)-Anilide

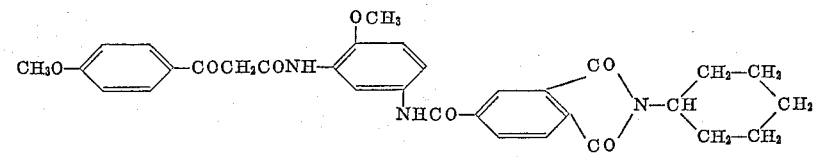

In place of the 4.61 parts of 4-chlorocarbonyl-N-n-octadecylphthalimide used in Example 2 there are used 2.9 parts of 4-chlorocarbonyl-N-cyclohexylphthalimide. The colour coupler is recrystallised from chlorobenzene and is obtained as yellow needle crystals melting at 238–240° C. and on analysis is found to contain 67.0% of carbon, 5.4% of hydrogen and 7.3% of nitrogen. ($C_{32}H_{30}O_7N_3$ requires 67.6% of carbon, 5.3% of hydrogen and 7.4% of nitrogen.)

The 4-chlorocarbonyl-N-cyclohexylphthalimide used in the above example melts at 114–116° C. after crystallisation from a petroleum ether fraction boiling between 80 and 100° C. containing a little benzene. (Found: 4.6% of nitrogen and 12.4% of chlorine. $C_{15}H_{13}O_3NCl$ requires 4.8% of nitrogen and 12.2% of chlorine.) The 4-carboxy-N-cyclohexylphthalimide from which the acid chloride is derived melts at 216–218° C. after crystallisation from n-propanol.

The colour coupler is converted to 4'-methoxybenzoyl-acet-2-methoxy-5(3(or 4)cyclohexylcarbonylamino-4(or 3)carboxybenzoylamino) anilide when treated as follows:

A mixture of 1.55 parts of the colour coupler, 10 parts of n-propanol and 4 parts of 2 N potassium hydroxide solution is warmed on the steam bath when a solution is obtained after a few minutes. The solution is then acidified with acetic acid and diluted with water when 4'-methoxybenzoylacet - 2 - methoxy - 5(3(or 4)cyclohexylcarbonylamino - 4(or 3) - carboxybenzoylamino)anilide crystallises out, which is then filtered off, washed with water and dried. The colour coupler is pale yellow in colour and melts at 192–193° C. with decomposition.

The soluble colour former so obtained is incorporated in a colour developer solution in the following manner:

80 parts of trisodium phosphate and 1.2 parts of hydroxylamine sulphate are dissolved in 400 parts of water tion and subsequently bleached and fixed a yellow dye image with a light absorption maximum at 443 millimicrons is obtained.

EXAMPLE 27

*4' - Methoxybenzoylacet - 2 - Methoxy - 5(N-Benzyl-phthalimid-4-yl-Carbonylamino)-Anilide*

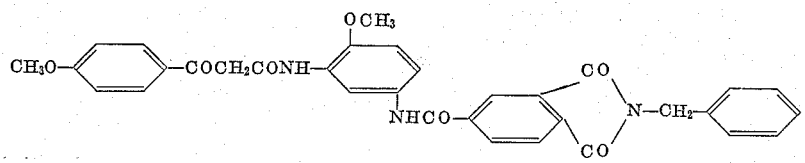

In place of the 4.61 parts of 4-chlorocarbonyl-N-n-octadecylphthalimide used in Example 2 there are used 3.0 parts of 4-chlorocarbonyl-N-benzylphthalimide. The colour coupler is recrystallised from acetic acid and is obtained as yellow crystals melting at 222–224° C. and on analysis is found to contain 68.3% of carbon, 4.5% of hydrogen and 7.2% of nitrogen. ($C_{33}H_{27}O_7N_3$ requires 68.6% of carbon, 4.7% of hydrogen and 7.25% of nitrogen.)

The 4-chlorocarbonyl-N-benzylphthalimide used in the above example melts at 80–82° C. after crystallisation from a mixture of a petroleum ether fraction boiling between 80 and 100° C. and benzene. (Found: 4.5% of nitrogen and 12.4% of chlorine. $C_{16}H_{10}O_3NCl$ requires 4.65% of nitrogen and 11.85% of chlorine.) The 4-carboxy-N-benzylphthalimide from which the acid chloride is derived melts at 198–200° C. after crystallisation from n-propanol.

The colour coupler is converted to 4'-methoxybenzoylacet-2-methoxy - 5 - (3(or 4)benzylcarbonylamino-4(or 3)carboxybenzoylamino)anilide by treatment with 2 N potassium hydroxide solution and n-propanol as described in Example 26 for the analogous cyclohexyl compound. The colour coupler so obtained is pale yellow in colour and melts at 180–183° C. with decomposition.

The soluble colour former so obtained is incorporated in a colour developer solution and a dye image produced according to the method given in Example 27. The yellow dye image obtained has a light absorption maximum at 443 millimicrons.

EXAMPLE 28

*4' - Methoxybenzoylacet - 2 - Methoxy - 5{α[N - (4 - n-Dodecylphenyl)Succinimido]Acetylamido} Anilide*

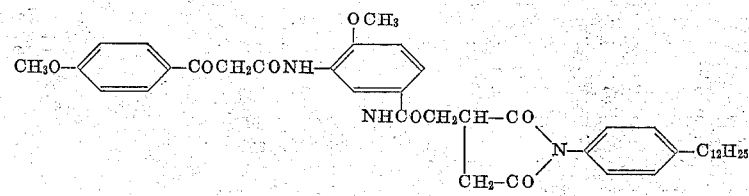

(Solution A). 2 parts of the colour coupler are suspended in 100 parts of ethanol (B). 2 parts of 4-amino-3-methyl-N-diethylaniline, 10 parts of anhydrous sodium sulphite and 4 parts of potassium bromide are dissolved in 400 parts of water (Solution C).

B is added to Solution A, Solution C then being added with stirring and the volume made up to 1000 parts with water.

When a film carrying a gelatin silver halide emulsion is exposed to light and then developed in the developer solution 3.88 parts of α[N(4 - n - dodecylphenyl)succinimido]-acetyl chloride is added to a solution of 2.9 parts of 4'-methoxybenzoylacet - 2 - methoxy - 5 - aminoanilide and 0.76 part of anhydrous sodium acetate in 20 parts of acetic acid at 100° C. After one hour at 100° C. the reaction mixture is filtered from sodium chloride and the filtrate diluted with 50 parts of diethyl ether. The precipitated colour coupler is filtered off, washed with diethyl ether, and recrystallised from n-propanol when it is obtained as colourless micro crystals melting at 148–150° C.

A photographic emulsion layer containing 3.85 parts of the colour coupler formulated by the method of Example 19 gives a yellow dye image with a light absorption maximum at 430 millimicrons.

EXAMPLE 29

4' - (N - n - Tetradecylphthalimid - 4 - yl - Carbonyl - amino)Benzoylacet - 3:5 - Dicarbomethoxy Anilide

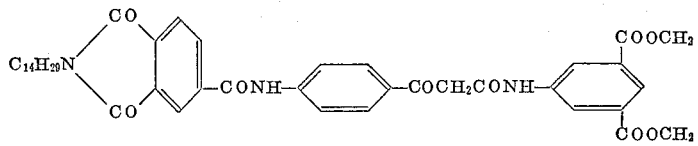

A mixture of 11.1 parts of 4'-aminobenzoylacet-3:5-dicarbomethoxy anilide, 2.5 parts of anhydrous sodium acetate, 13 parts of 4-chlorocarbonyl-N-n-tetradecylphthalimide and 60 parts of acetic acid is stirred and heated under reflux for 1½ hours. After cooling, the colour coupler is filtered off, washed with methanol and then diethyl ether and recrystallised from ethyl acetate. The colour coupler is obtained as cream coloured crystals melting at 242–244° C. and on analysis is found to contain 67.9% of carbon, 6.5% of hydrogen and 5.6% of nitrogen. ($C_{42}H_{49}O_9N_3$ requires 68.2% of carbon, 6.65% of hydrogen and 5.7% of nitrogen.)

EXAMPLE 30

1 - Hydroxy - N[β(N - n - Dodecylphthalimid - 4 - yl-Carbonylamino)Ethyl]-2-Naphthamide

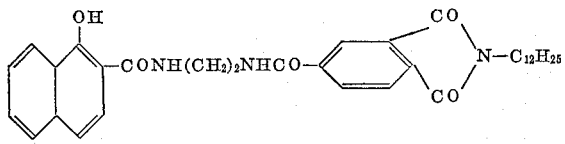

A mixture of 9.2 parts of 1-hydroxy-N-(β-aminoethyl)2-naphthamide, 3.3 parts of anhydrous sodium acetate, 15.1 parts of 4-chlorocarbonyl-N-n-dodecylphthalimide and 60 parts of acetic acid is heated under reflux for one hour. The reaction mixture is filtered from sodium chloride and the filtrate diluted with 50 parts of methanol, cooled and the precipitated colour coupler filtered off and recrystallised from ethanol. The colour coupler is obtained as cream coloured crystals melting at 158–161° C. and on analysis is found to contain 71.0% of carbon and 7.2% of hydrogen. ($C_{34}H_{41}O_5N_3$ requires 71.45% of carbon and 7.2% of hydrogen.)

A photographic emulsion layer containing the colour coupler may be obtained in the following manner:

3.5 parts of 2 N potassium hydroxide solution is added to a suspension of 1.39 parts of the colour coupler in 10 parts of n-propanol. The mixture is warmed and when a solution is obtained water is added to give a total of 25 parts. The colour coupler so obtained is added to 200 parts of a red-sensitive gelatin silver halide emulsion and the emulsion coated on to a film base and the coated layer dried. When the photographic material so obtained is exposed to red light, developed in a colour developer containing 4-amino-N-ethyl-N-ε-hydroxypentylaniline, bleached and fixed a cyan dye image is obtained.

EXAMPLE 31

1-Hydroxy-N{β[N(4-n-dodecylphenyl)phthalimid-4-yl-carbonylamino]ethyl}-2-naphthamide

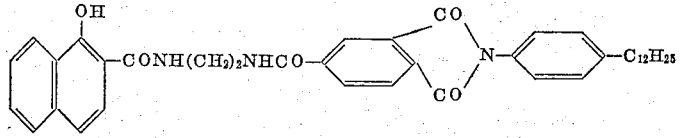

In place of the 15.1 parts of 4-chlorocarbonyl-N-n-dodecylphthalimide used in Example 30 there are used 18.14 parts of 4-chlorocarbonyl-N-(4-n-dodecylphenyl)-phthalimide. The colour coupler is recrystallised from n-propanol and is obtained as cream coloured micro crystals melting at 200–201° C. On analysis the colour coupler is found to contain 74.4% of carbon and 7.5% of hydrogen. ($C_{40}H_{45}O_5N_3$ requires 74.2% of carbon and 7.0% of hydrogen.)

A photographic emulsion layer containing 1.58 parts of the colour coupler formulated by the method of Example 30 gives a cyan dye image.

EXAMPLE 32

To 200 parts of a gelatin silver halide emulsion there are added 50 parts of a 5% aqueous alcoholic solution of the potassium salt of 4'-methoxybenzoylacet-2-N-methyl-N-n-octadecylamino-5-carboxanilide. The blue-sensitive emulsion so obtained is coated on a paper base and the coated layer dried. A 3% aqueous solution of gelatin is then coated on top of the blue-sensitive layer to form a gelatin separation layer. A green-sensitive emulsion obtained as described in Example 13 is then coated on top of the gelatin separation layer. A gelatin separation layer is then coated on top of the green-separation layer. A red-sensitive emulsion comprising 200 parts of a red-sensitive gelatin silver halide emulsion and 50 parts of a 5% aqueous solution of the sodium salt of 1-hydroxy-4-sulpho-N-n-octadecyl-2-naphthamide is then coated on top of the gelatin separation layer.

The multilayer colour photographic paper so obtained is exposed to the light from a colour negative, developed in a colour developer containing 4-amino-N-ethyl-N-ε-hydroxypentylaniline, bleached and fixed. A colour print is obtained.

What I claim is:
1. A photographic silver halide emulsion containing a colour coupler of the formula:

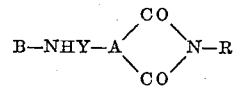

where A is a trivalent radical selected from the class consisting of

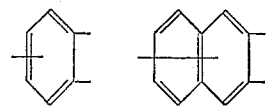

and

where *n* is selected from 1 and 2, B—NH— is the residue of a colour coupler compound of the formula B—NH₂ selected from the class consisting of such compounds wherein B contains a —CO—CH₂—CO— group and the compound gives a yellow dyestuff on colour development with substituted p-phenylene diamines, such compounds wherein B contains a cyanacetyl group and the compound gives a magenta dyestuff on said colour development, such compounds wherein B contains a pyrazolone ring and the compound gives a magenta dyestuff on said colour development, and such compounds wherein B is a phenolic residue and the compound gives a cyan image on said colour development, and such compounds wherein B is a naphtholic residue and the compound gives a cyan image on said colour development, Y is selected from the class consisting of the groupings —CO—, —SO₂—, —CONH—, —COCH₂— and —CSNH—, and R is selected from the class consisting of hydrogen and hydrocarbon groups.

2. A photographic element comprising a support and a plurality of layers of light-sensitive silver halide emulsion carried by said support, at least one of said layers containing a colour coupler of the formula:

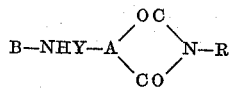

where A is a trivalent radical selected from the class consisting of

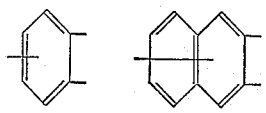

and

where *n* is selected from 1 and 2, B—NH— is the residue of a colour coupler compound of the formula B—NH₂ selected from the class consisting of such compounds wherein B contains a —CO—CH₂—CO— group and the compound gives a yellow dyestuff on colour development with substituted p-phenylene diamines, such compounds wherein B contains a cyanacetyl group and the compound gives a magenta dyestuff on said colour development, such compounds wherein B contains a pyrazolone ring and the compound gives a magenta dyestuff on said colour development, and such compounds wherein B is a phenolic residue and the compound gives a cyan image on said colour development, and such compounds wherein B is a naphtholic residue and the compound gives a cyan image on said colour development, Y is selected from the class consisting of the groupings —CO—, —SO₂—, —CONH—, —COCH₂— and —CSNH—, and R is selected from the class consisting of hydrogen and hydrocarbon groups.

3. A photographic colour developer comprising in alkaline solution a substituted p-phenylene diamine and a colour coupler of the formula:

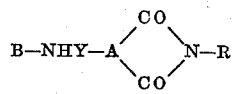

where A is a trivalent radical selected from the class consisting of

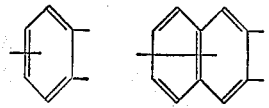

and

where *n* is selected from 1 and 2, B—NH— is the residue of a colour coupler compound of the formula B—NH₂ selected from the class consisting of such compounds wherein B contains a —CO—CH₂—CO— group and the compound gives a yellow dyestuff on colour development with substituted p-phenylene diamines, such compounds wherein B contains a cyanacetyl group and the compound gives a magenta dyestuff on said colour development, such compounds wherein B contains a pyrazolone ring and the compound gives a magenta dyestuff on said colour development, and such compounds wherein B is a phenolic residue and the compound gives a cyan image on said colour development, and such compounds wherein B is a naphtholic residue and the compound gives a cyan image on said colour development, Y is selected from the class consisting of the groupings —CO—, —SO₂—, —CONH—, —COCH₂— and —CSNH—, and R is selected from the class consisting of hydrogen and hydrocarbon groups.

References Cited by the Examiner

UNITED STATES PATENTS

| | | | |
|---|---|---|---|
| 2,280,722 | 4/42 | Schneider et al. | 96—100 |
| 2,313,498 | 3/43 | Allen et al. | 96—100 |
| 2,694,718 | 11/54 | Salminen et al. | 96—100 |
| 2,857,395 | 10/58 | Arnold | 260—310 |
| 2,897,206 | 7/59 | Fukui | 260—310 |
| 2,911,410 | 11/59 | Ramsay | 96—54 X |
| 2,920,961 | 1/60 | Bush et al. | 96—100 |
| 2,930,693 | 3/60 | Ganguin et al. | 96—74 X |
| 2,992,920 | 7/61 | De Cat et al. | 96—100 |
| 3,080,233 | 3/63 | Roth et al. | 96—100 |

NORMAN G. TORCHIN, *Primary Examiner.*

HAROLD N. BURSTEIN, *Examiner.*